May 17, 1927.
J. F. RALEIGH
1,628,740
LOCKING DEVICE
Filed Jan. 9, 1925
2 Sheets-Sheet 1
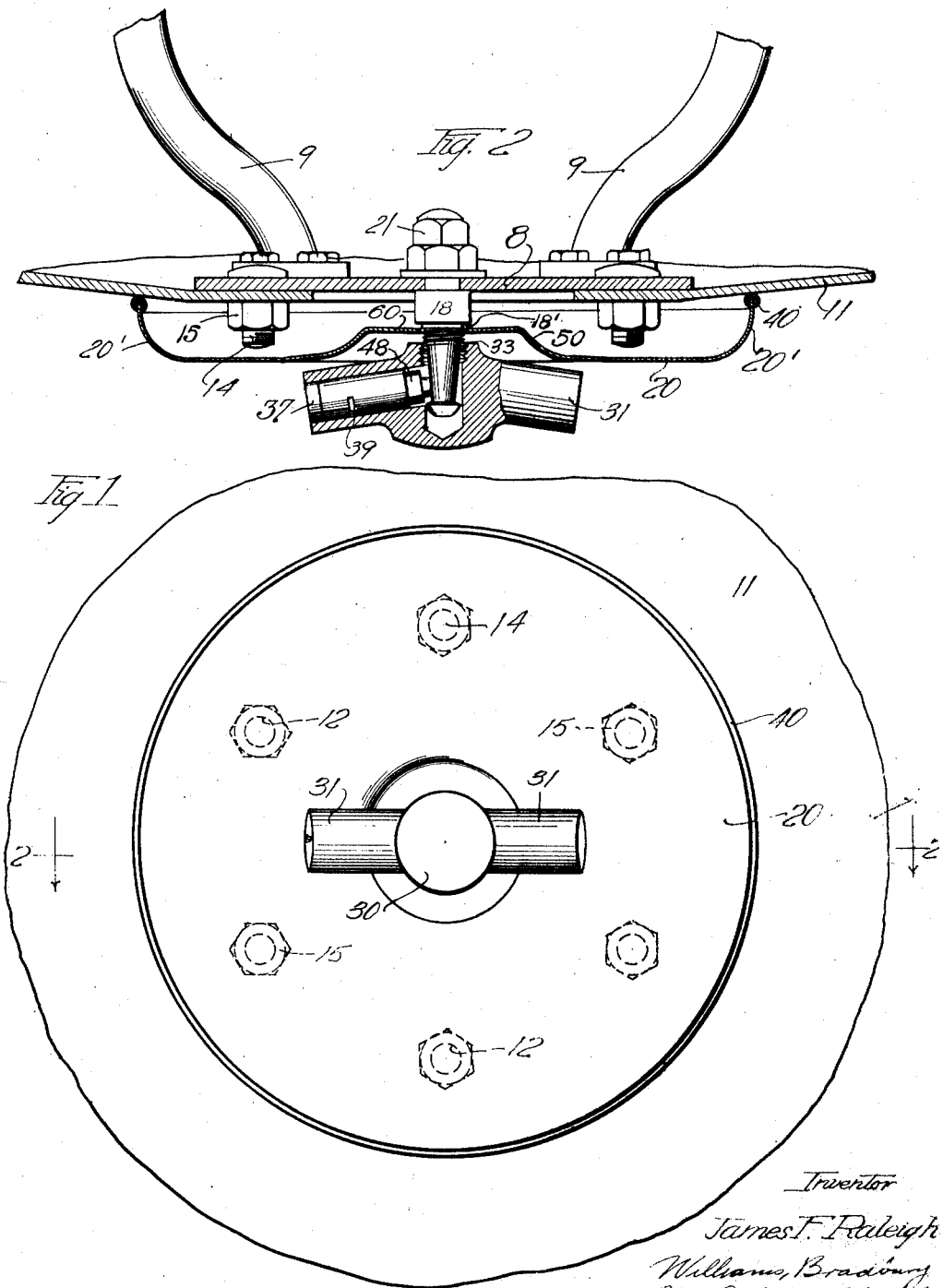

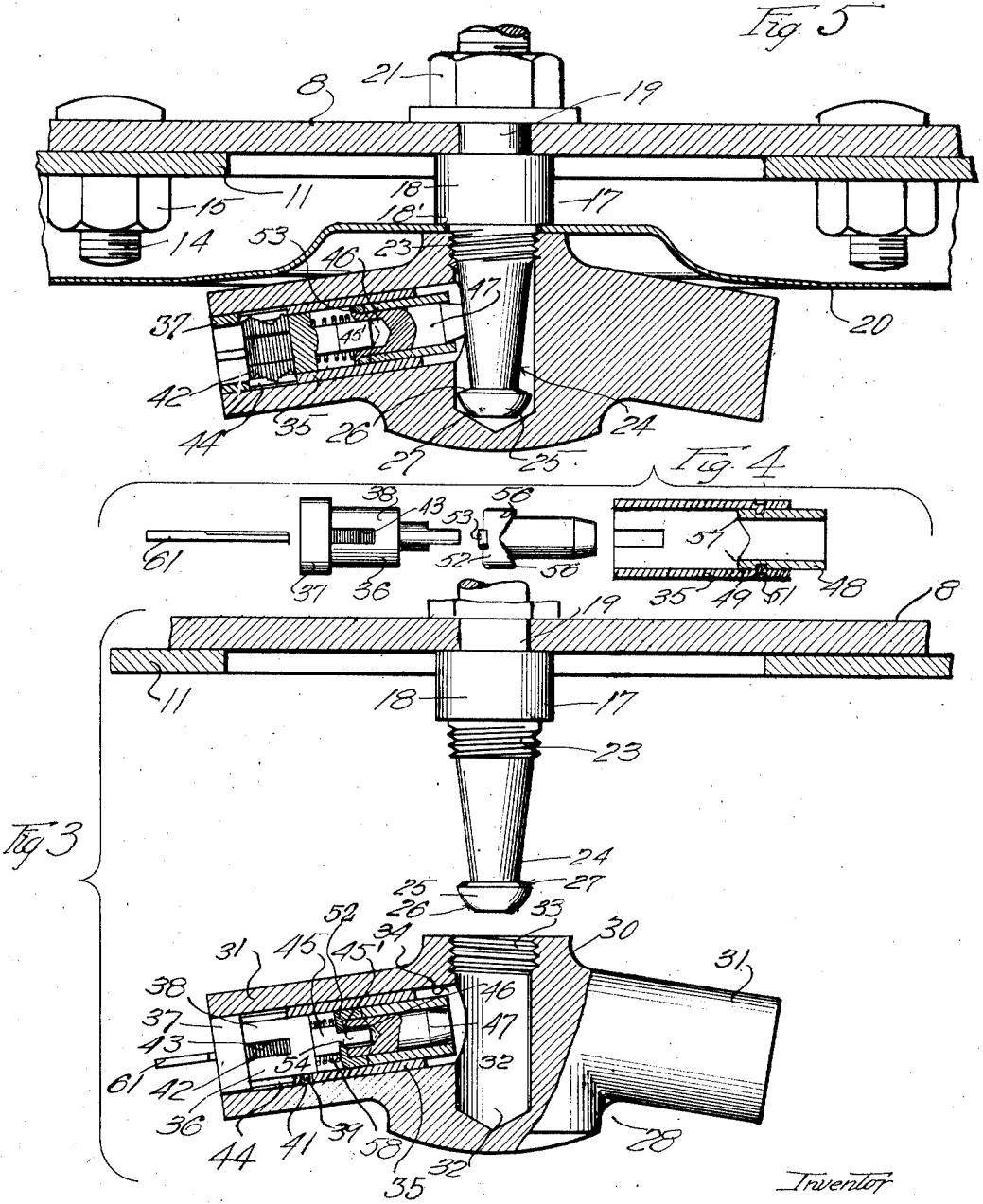

Patented May 17, 1927.

1,628,740

UNITED STATES PATENT OFFICE.

JAMES F. RALEIGH, OF CHICAGO, ILLINOIS, ASSIGNOR TO PINES WINTERFRONT COMPANY, OF CHICAGO, ILLINOIS, A CORPORATION OF DELAWARE.

LOCKING DEVICE.

Application filed January 9, 1925. Serial No. 1,444.

The present invention relates to locking devices and has particular reference to spare wheel locks for automobiles, although, as will be apparent from the following description of my improved locking device, the fundamental features thereof are applicable to locks for other uses as well.

My improved locking device may be characterized generally as one of that type which is screwed or otherwise rotated to locking position over a mounting member, but which, when in locked condition, is free to be rotated without being released from this mounting member. This characteristic of being rotatable while locked avoids the possibility of the thief breaking the lock through the application of a powerful leverage to the lock for rotating the same.

Heretofore, these locking devices have generally comprised an outer operating member and an inner threaded member which is rotatably supported in the outer operating member in the manner of a bushing. This inner threaded member is screwed upon the mounting member to which the device is fastened by establishing a temporary operative connection between the outer operating member and the inner threaded member, whereby the inner threaded member is rotated positively with the outer operating member. The locked condition is then obtained by severing this operative connection between the outer operating member and the innner threaded member, which leaves the outer operating member free to be rotated without turning the inner threaded member.

It will be apparent, however, that the locked relation is dependent upon the existence of a greater degree of friction between the inner threaded member and the mounting member than exists between the inner threaded member and the outer operating member. This introduces a factor of uncertainty in the effectiveness of the lock, which is very objectionable. For example, rust, corrosion, freezing or sweating may easily produce a greater degree of friction between the inner threaded member and the outer operating member than exists between the inner threaded member and the mounting member. When this occurs, the entire lock can be screwed off the mounting member by simply rotating the operating member. Furthermore, this type of lock can be easily circumvented by drilling the side of the operating member and punching the operating member into firm frictional engagement with the inner threaded member.

It is one of the objects of my invention to avoid these disadvantages by providing an improved lock structure in which this inner threaded member has been eliminated. The above factor of uncertainty is entirely removed from my improved locking device, where no reliance is placed upon the relative coefficients of friction between two joints, but instead, a positively locked relation is maintained between the mounting member and the main locking or retaining member.

The elimination of this inner threaded member simplifies the construction of the device materially by eliminating this part and also eliminating the necessity of a retaining ring or other means employed to lock the inner threaded member and the outer operating member together against longitudinal separation. This retaining ring is a source of weakness from the standpoint of withstanding longitudinal separating pressure exerted on the outer operating member, and frequently fails to assume its proper position in the matching grooves in the inner and outer members, permitting these members to come apart.

A further object achieved by my invention is the provision of a spare wheel lock, or lock of this general type, which can be re-applied to its mounting member without the presence of the key in the lock barrel. One's hands are usually dirtied in changing wheels and it is objectionable to have to obtain or replace the key in one's pocket in the replacing of the lock device. The present locking device can be re-applied without the presence of the key in the lock barrel, the lock mechanism snapping to locked condition as the device is slipped over the mounting member.

Other objects will be apparent from the following detailed description of a preferred embodiment of my invention.

In the accompanying drawings illustrating this preferred embodiment:

Figure 1 is an end elevational view of my improved locking device applied to its mounting stud in the operation of locking a spare wheel to its supporting bracket;

Figure 2 is a horizontal sectional view taken approximately on the plane of the line 2—2 of Fig. 1;

Figure 3 is a detailed sectional view of the locking device, showing the rotatable retaining member removed from the mounting stud, and with the locking bolt retracted;

Figure 4 is an exploded view of the locking bolt and its operating parts, and

Figure 5 is a sectional view through the locking device applied in locked position to the mounting stud.

In Figs. 1 and 2 I have shown an exemplary form of spare wheel mounting bracket which is intended as being representative of different types of spare wheel mounts to which my improved locking device is applicable. This mounting bracket comprises a circular plate 8 supported by a plurality of supporting arms 9 extending from the body of the car. This bracket may be supported at the rear end of the car or along the side of the car above the running board, both locations being prevalent for spare wheel mounting.

A disk type of spare wheel is illustrated fragmentarily by the portion of disk 11, the hub portion of this disk being generally provided with a plurality of apertures 12 for receiving hub bolts carried on the hub of the wheel. For rigidity of mounting, the plate 8 is provided with a plurality of stud bolts 14 which are adapted to be received in these openings 12 when the wheel is mounted on the bracket plate 8. Nuts 15 screw over the stud bolts and rigidly clamp the disk of the spare wheel to the bracket plate. The stud bolts 14 are riveted or otherwise suitably anchored to the bracket plate.

Extending centrally from this bracket plate is a mounting stud 17. This stud has an enlarged collar portion 18 which bears against the outer side of the bracket plate 8, and has a reduced portion 19 which extends through an aperture in the bracket plate. The rear end of the mounting stud is suitably secured to the rear side of the bracket plate 8 so as to be irremovable therefrom, such as by screwing a nut over the threaded rear end of the stud and riveting over the projecting end of the stud on the outside of the nut 21.

Continuing from the collar 18, the stud is provided with a thread 23, and from this thread the projecting shank portion is slightly tapered, as indicated at 24. On the outer end of this tapered shank is formed a button-like head 25 having a relatively abrupt locking shoulder 26 on its under side and a sloped cam surface 27 on its upper side. This mounting stud 17 receives a locking disk or cover plate 20 which is adapted to fit over the stud bolts 14 and bear against the disk 11 of the wheel, thereby preventing access to the stud bolt 14 and preventing removal of the wheel. The inwardly curved flange 20' of this cover plate 20 may have its edge faced with a slotted strip of rubber 40, or other resilient or pliable facing bead, to prevent marring the surface of the disk wheel 11. This rubber facing bead also prevents the entrance of dust, dirt, etc. to the central hub opening of the disk wheel and to the stud bolts 14 and nuts 15. The central part of the cover plate 20 is formed with a cupped portion 50 having a central aperture 60 which slips on over the thread 23 and bears against the outer shoulder of the collar 18. The plate 20 is stamped so that the cupped portion 50, and the plate as a whole, will have a certain resiliency tending to spring it away from the shoulder 18' of the collar 18. This resiliency acts as a lock washer for preventing rattle or loosening of the outer retaining member 28, which I shall now describe.

The retaining member 28 comprises a casting preferably in the form of a central hub portion 30 having two radially extending arms 31. The hub portion 30 is provided with an axial bore 32 which has a thread 33 in its outer end for screwing over the thread 23 of the mounting stud. One of the arms 31 has a bore 34 which is extended in to intersect the bore 32 above the thread 33, as clearly shown in Fig. 3.

Rigidly secured in the bore 34, as by pinning, is a mounting sleeve 35. Supported in the outer end of this mounting sleeve is any suitable form of lock mechanism 36. In the particular embodiment herein shown, I have illustrated a pin tumbler lock, although it will be evident that I may use a combination lock if desired. This pin tumbler lock has an outer collar 37, generally of hardened metal, which closes the front end of the lock barrel. The sleeve 35 may be case hardened or composed of protective metal for preventing the circumvention of the lock by sawing or drilling laterally through the arm 31. With the form of lock shown, the lock barrel 38 is adapted for rotation in the end of the sleeve 35, having a pin 39 lying in a semi-circular slot 41 in the sleeve for preventing the longitudinal removal of the lock barrel from the sleeve. The tumblers 42 project from diametrically opposite slots 43 in the lock barrel and are adapted to project into diametrically opposite slots 44 in the sleeve 35 for locking the barrel against rotation.

Projecting from the inner end of the lock barrel is a reduced shank 45 having its sides splayed off at the end for providing a flat-sided key portion 45' projecting into a correspondingly formed socket 46 in the locking bolt 47. This locking bolt is guided for reciprocation in a small guide sleeve 48 which is rigidly secured in the inner end of the sleeve 35 and projects from the end thereof, as shown in Fig. 4. For mounting the guide sleeve 48 in the outer sleeve 35, the sleeve 48 may be provided with small sockets or apertures 49 into which the metal of the sleeve 35 is punched, as indicated at 51. The locking bolt 47 is provided with a head 52, which is secured to the bolt by extending tongues 53 from the bolt up through the slot 54 in the end of the head and spreading these tongues outwardly across the top of the head. At diametrically opposite points this head is formed with V-shaped cams 56 which cooperate with similar V-shaped cams 57 formed in the adjacent end of the guide sleeve 48. A compression spring 58 encircling the shank 45 and confined between the lock barrel 38 and the bolt head 52 normally tends to project the bolt inwardly against the side of the mounting stud 17, as shown in Fig. 5. The locking bolt assumes this inwardly projecting locking position when the V-shaped cams 56 register with the V-shaped recesses 57 in the guide sleeve 48. It will be apparent that, upon rotating the lock barrel 38, through the instrumentality of the key 61, the cams 56 will ride up upon the high points of the cam surfaces 57 and withdraw the locking bolt 47 back to the unlocked position shown in Fig. 3.

In the operation of the device, the insertion of the key 61 in the lock barrel and the rotation of the lock barrel will rotate the wedge-shaped cams 56 up onto the high points of the fixed cams 57, thereby retracting the locking bolt 47 from the path of the locking shoulder 26 on the mounting stud 17. The retaining member 28 can then be unscrewed from the thread 23 and completely removed from the end of the mounting stud. This frees the locking disk 20, by the removal of which access is afforded to the stud bolts 14 for the removal of the wheel.

After the wheels have been interchanged, and the other wheel has been replaced on the bracket plate 8, the locking disk 20 is replaced and the retaining unit 28 slipped over the end of the mounting stud. As the retaining unit is pushed inwardly to engage the threads 23 and 33, the projecting end of the locking bolt 47 (assuming the key to have been withdrawn, or the bolt to be in locking position) will engage the sloped outer surface 27 of the mounting stud and will cam itself back out of the bore 32 to clear the edge of the locking shoulder 26. As the retaining member is pushed further onto the stud, this locking bolt will snap back into locking position behind the locking shoulder 26 under the action of the spring 58. Thereupon the retaining member will be securely locked to the mounting stud, in advance of the engagement of the threads 23 and 33. The continued movement of the retaining member will bring these two threads into engagement and thereupon the retaining member can be screwed down to firmly clamp the locking disk 20 to the shoulder 18' of the mounting stud. It will thus be seen that the present retaining device can be replaced and relocked on the mounting member without the presence of the key in the lock barrel and irrespective of the position of the locking bolt. This is an advantage, as it permits the key to be immediately replaced in the pocket after releasing the lock, thus avoiding the objection of having to reach into one's pockets with dirty hands after changing a wheel to obtain the key or replace it in the pocket. The ability to merely insert the key, turn it and withdraw it without having to leave the key in the lock during rotation of the device avoids twisting the key chain to which the key may be attached.

When the retaining member is screwed in to press the locking disk 20 against the shoulder 18' of the mounting stud, the central portion of the locking disk is flexed inwardly and the resulting resilient pressure of the disk against the retaining member acts as a lock washer to hold the retaining member in set position, and also prevents rattle of the disk, etc.

It will be apparent that any attempt to release the retaining member by unscrewing is of no avail, for, after the threads 23 and 33 clear each other, the locking bolt 47 encounters the locking shoulder 26 and positively holds the retaining member against endwise removal. The retaining member is left free to rotate, however, so that the lock cannot be broken by applying a rotative leverage to the device. It will be noted that the locking bolt 47 does not encounter the locking shoulder 26 until after the threads 23 and 33 have cleared each other, which prevents the mechanical advantage of the threads being utilized to break the bolt against the locking shoulder 26.

It will be apparent that my invention is applicable to many standard installations of spare wheel mounts with little or no alteration of standard construction. For example, where no cover plate 20 is employed and there is no provision for a central mounting stud, one of the stud bolts 14 can be removed and a stud similar to the mounting stud 17 substituted. Also, such a substituted mounting stud can be extended through a laterally disposed opening in the cover plate where such cover plate is employed.

Having thus described my invention, what I claim, is:

1. In a locking device of the class described, the combination of a mounting member, a retaining member having threaded engagement with said mounting member, lock mechanism carried by said retaining member, and a locking shoulder on said mounting member for cooperating with said lock mechanism, said locking shoulder preventing longitudinal separation of said members, but permitting rotative movement therebetween.

2. In a locking device of the class described, the combination of a mounting member, a retaining member adapted to be rotated into retaining engagement with said mounting member, lock mechanism associated with said retaining member, and a locking shoulder associated with said mounting member adapted to cooperate with said lock mechanism, said locking shoulder permitting relative rotation between said members but preventing longitudinal separation of said members when said lock mechanism is in locked condition.

3. In a locking device of the class described, the combination of a mounting member, a retaining member separable from said mounting member by relative longitudinal movement, lock mechanism carried by said retaining member, and an annular shoulder on said mounting member for cooperating with said lock mechanism, said annular shoulder permitting rotation between said members when said lock mechanism is in locked condition, but preventing longitudinal separation between said members.

4. In a locking device of the class described, the combination of a mounting member having a thread thereon, a retaining member having a cooperating thread thereon, and lock mechanism for locking said members against separation while permitting relative threading motion therebetween.

5. In a locking device of the class described, the combination of a mounting member having a thread thereon, a retaining member having a bore for receiving said mounting member, a thread in said bore for cooperating with the thread of said mounting member, and lock mechanism operative to lock said members against longitudinal separation after the disengagement of said threads.

6. In a locking device of the class described, the combination of a mounting member having a thread thereon and a locking shoulder, a retaining member having a bore threaded for screwing over said mounting member, and a locking member in said retaining member adapted to be projected into the path of said locking shoulder to prevent longitudinal separation of said retaining member from said mounting member.

7. In a locking device of the class described, the combination of a mounting stud having a thread thereon and a locking shoulder, a retaining member receivable longitudinally over said stud, a thread in said retaining member adapted to engage with thread on said mounting stud, and a locking bolt carried by said retaining member adapted to cooperate with said locking shoulder to prevent longitudinal separation of said mounting stud and said retaining member while permitting relative threading motion therebetween.

8. In a locking device of the class described, the combination of a support, a mounting stud projecting from said support, said stud having a thread adjacent its inner end and an annular locking shoulder adjacent its outer end, a retaining member having a bore therein for fitting over said stud, a thread in said bore for cooperating with the thread on said stud, and a locking bolt carried by said retaining member adapted to be projected into said bore in the path of said locking shoulder.

9. In a locking device of the class described, the combination of a support, a mounting stud projecting from said support, said stud having a thread adjacent its base end, and an annular locking shoulder adjacent its outer end, a retaining member comprising a laterally extending arm, said retaining member having a bore provided with a thread for cooperating with the thread on said stud, a locking bolt reciprocably supported in said arm, and a lock in said arm for reciprocating said bolt, said locking bolt being projected into said bore in the path of said locking shoulder and preventing longitudinal separation of said retaining member from said mounting stud while permitting relative rotation therebetween.

10. In a locking device of the class described, the combination of a mounting member, a retaining member having threaded engagement with said mounting member, a locking shoulder on said mounting member, and a spring-pressed locking bolt carried by said retaining member for cooperating with said locking shoulder, said locking shoulder permitting limited longitudinal movement of said retaining member relative to said mounting member.

11. In a locking device of the class described, the combination of a mounting stud having a thread thereon and a locking shoulder, a retaining member having a cooperating thread for screwing over the thread on said stud, a locking bolt carried by said retaining member, said bolt permitting rotative movement and limited longitudinal movement of said retaining member relative to said mounting stud, spring means normally projecting said bolt inwardly to cooperate with said locking shoulder, and lock mechanism for withdrawing said locking bolt from the path of said shoulder.

12. In a locking device of the class described, the combination of a mounting member having a thread thereon, a retaining member screwing over said mounting member, and locking mechanism limiting the longitudinal separating motion between said members.

13. In a locking device of the class described, the combination of a mounting member, a retaining member rotating to locked position over said mounting member, and a locking member carried by said retaining member adapted to engage with lock means associated with said mounting member for limiting the longitudinal separating motion between said mounting member and said retaining member.

14. In a locking device of the class described, the combination of a threaded mounting member, a threaded retaining member screwing over said mounting member for holding a member to be locked on said mounting member, and a spring-pressed bolt carried by said retaining member adapted to engage locking means on said mounting member, said bolt and locking means permitting limited longitudinal motion between said members but preventing complete separation of said members.

15. A wheel lock and support comprising a stud adapted to extend through a spare wheel, a locking device comprising a body adapted to be given a gross adjustment on the stud by rectilinear movement of the body axially of the stud, locking means preventing withdrawal of the body from the stud when said gross adjustment has been effected, but permitting rotary movement of the body relative to the stud, and cooperating screw threads on the body and stud whereby to effect a final adjustment of said body relatively to the stud with the body locked against withdrawal from the stud as aforesaid.

16. In a wheel lock, a stud, a wheel clamping device adapted to receive a gross adjustment on said stud by rectilinear movement axially of the stud, a lock carried with said clamping device adapted after said gross adjustment has been effected to cooperate with said stud to prevent withdrawal of the clamping device from the stud without preventing free rotation relative to the stud of the clamping device and all parts carried therewith, said clamping device being provided with screw threads adapted to cooperate with other screw threads to effect a final adjustment of the clamping device by rotary movement of said clamping device.

In witness whereof, I hereunto subscribe my name this 7 day of January, 1925.

JAMES F. RALEIGH.